United States Patent [19]

Okamoto

[11] 3,817,144
[45] June 18, 1974

[54] GROUP TEACHING SYSTEM FOR MUSICAL INSTRUMENTS
[75] Inventor: Eisaku Okamoto, Hamakita, Japan
[73] Assignee: Nippon Gakki Seizo Kabushiki Kaisha, Hamamatsu-shi, Japan
[22] Filed: Mar. 15, 1973
[21] Appl. No.: 341,584

[30] Foreign Application Priority Data
Mar. 16, 1972  Japan .............................. 47-26966

[52] U.S. Cl. .................................. 84/470, 84/1.01
[51] Int. Cl. .......................................... G09b 15/00
[58] Field of Search ............ 84/1.01, 470, 478, 477; 35/5, 6, 35; 179/170.6, 170.8, 1; 307/100

[56] References Cited
UNITED STATES PATENTS
| | | | |
|---|---|---|---|
| 3,193,709 | 7/1965 | Baxter | 307/100 |
| 3,224,115 | 5/1965 | Auernheimer | 84/470 X |
| 3,267,591 | 8/1966 | Locke et al. | 84/470 X |
| 3,392,243 | 7/1968 | Skoog | 179/170.8 |
| 3,470,785 | 10/1969 | Shallenberger et al. | 84/470 |
| 3,475,833 | 11/1969 | Andersen | 35/5 X |

Primary Examiner—Richard B. Wilkinson
Assistant Examiner—Vit W. Miska
Attorney, Agent, or Firm—Flyyn & Frishauf

[57] ABSTRACT

In a group teaching system for musical instruments comprising a teacher station and a plurality of student stations, each station is provided with an electronic musical instrument, a transmitter and a receiver so that the teacher and respective students can hear their musical sounds through their own receivers. The teacher can call a particular student by manipulating selector switches whereby the teacher and a selected student can exchange musical and speech signals. The presence of the speech signal from the teacher is detected by a speech signal detector to produce a control signal which is used to control a volume control circuit connected between the electronic musical instrument and the receiver of the selected student station to lower the volume of the output of the electronic musical instrument whereby the selected student can clearly perceive a call from the teacher.

5 Claims, 2 Drawing Figures

GROUP TEACHING SYSTEM FOR MUSICAL INSTRUMENTS

BACKGROUND OF THE INVENTION

This invention relates to a group teaching system for musical instruments comprising a teacher station and a plurality of student stations.

A group training system for musical instruments has been developed in which a single teacher teaches a plurality students how to play electronic musical instruments.

Such a collective training system has an advantage that the teacher and students hear the sounds played by their musical instruments by using headphones without being interfered with by the sounds generated by the musical instruments of the others. The teacher station and the student station are interconnected by an information exchanging signal circuit which enables exchange of played sounds and speech between the teacher and the students. Thus, by selecting a particular information exchanging circuit on the side of the teacher's station it becomes possible to exchange information between the teacher station and a particular student station thus enabling one to one training.

More particularly, to perform the one to one training, the teacher selects a particular student station and then calls a particular student through the teachers microphone and the student receiver. At this time, in prior art systems, since the student is hearing the musical sound of his own electronic musical instrument through his own headphone, he often cannot hear the teacher's call when his music playing sound is loud. For this reason, in order to cause the called student to correctly acknowledge the teacher's call it is necessary to excessively increase the call signal, thereby impairing the auditory feeling of the student.

Accordingly, it is an object of this invention to provide an improved collective musical instrument training system capable of causing the students to correctly acknowledge the call signal sent to the student stations from the teacher station without the necessity of excessively increasing the call signal.

SUMMARY OF THE INVENTION

In accordance with this invention, there is provided a collective music training system comprising a plurality of student stations each including a first electronic musical instrument playing section, a first transmitter, and a first receiver coupled to the output of the first electronic musical instrument playing section, and a teacher station including a second electronic musical instrument playing section, a second transmitter, and a second receiver coupled to the second electronic musical instrument playing section, characterized in that each of the student stations comprises volume control means connected between the first electronic musical instrument playing section and the first receiver for selectively decreasing the output level of the first musical instrument playing section; and that the teacher station comprises means for detecting the presence of the output of the second transmitter for producing a control signal, and means for selecting a student station, the selecting means including means for applying the outputs from the first musical instrument playing section and the first transmitter in the selected student station to the second receiver in the teacher station, means for applying the outputs from the second musical instrument playing section and the second transmitter in the teachers station to the first receiver in the selected student station and means for applying the output of the detecting means to the volume control means in the selected student station. Preferably the selecting means includes gang-operated first, second and third switching means.

DESCRIPTION OF THE PREFERRED EMBODIMENT

Figure 1:
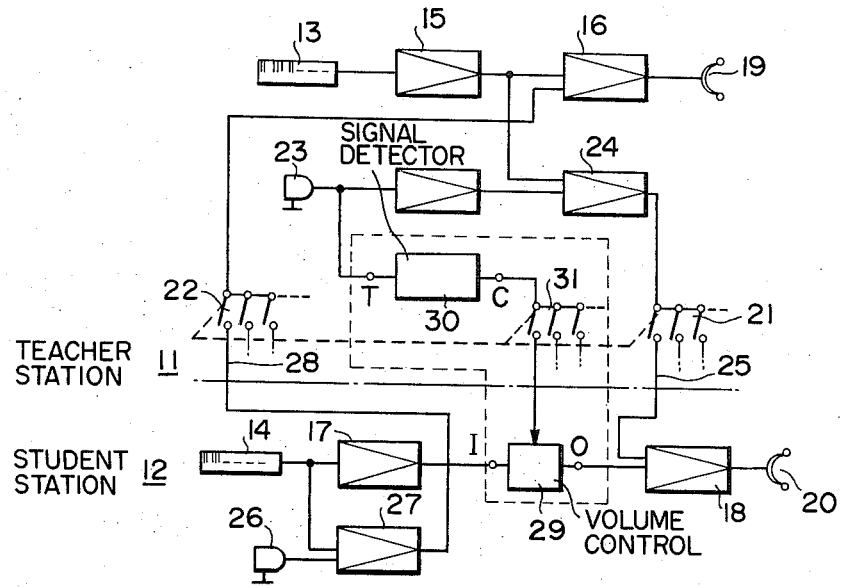
FIG. 1 shows a block diagram of a collective music training system utilizing electronic musical instruments and embodying the invention.
Figure 2:
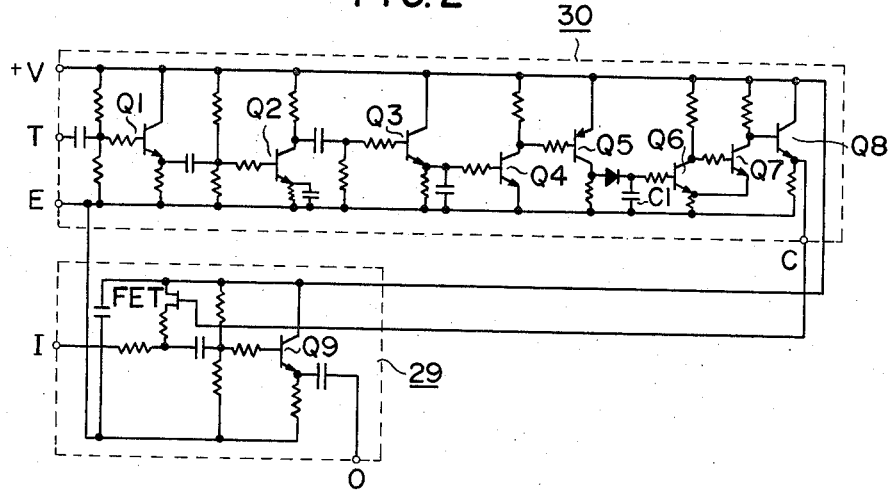
FIG. 2 is a connection diagram of the call signal detector and the volume control device utilized in the system shown in FIG. 1.

The group musical instrument training system shown in FIG. 1 comprises a teacher station 11 and a plurality of student stations 12. For the purpose of simplifying the drawing, only one of the student stations is shown. The teacher station 11 and the student station 12 are provided with electronic musical playing sections or instruments 13 and 14, respectively, and the musical signals generated by the musical instruments are amplified by amplifiers 15, 16 and 17, 18 respectively and the amplified signals are supplied to a teacher's headphone 19 and a student's headphone 20, respectively. The teachers station 11 is provided with interlocked first and second switch groups 21 and 22 for selecting a student station. The first switch group 21 is included in a first signal circuit 25 which transmits the musical signals played by the teacher to amplifier 18 in the student station 12 through an amplifier 24. The second selector switch group 22 is included in a second signal circuit 28 which transmits the musical signal played by the student and the speech signal from a microphone installed in the student station 12 to amplifier 16 in the teacher station 11 through an amplifier 27. A volume control device 29 which is controlled in a manner to be described later to decrease the level of the musical signals from the electronic musical instrument playing section 14, is connected between the playing section 14 and the student's headphone 20. Further, the teacher station 11 is provided with a speech signal detector 30 which detects the presence of the speech signal from teacher's microphone 23 to form a speech detection signal and a third switch group 31 which is interlocked (i.e., ganged) with the first and second selector switch groups 21 and 22 for applying the speech detection signal to the volume control device 29. The volume control device 29 and the speech detection device 30 shown in FIG. 1 are constructed as shown in FIG. 2. Terminals T, C, I and O shown in FIG. 2 correspond to the same terminals shown in FIG. 1. The speech signal from the teacher's microphone 23 is supplied to the terminal T and is amplified by transistors Q1 and Q2 to render transistors Q3, Q4 and Q5 conductive whereby a bias voltage is applied to the base electrode of transistor Q6. Transistors Q6 and Q7 constitute a Schmitt circuit so that in the presence of the speech signal, the transistor Q7 is maintained OFF and consequently the transistor Q8 fully ON. As a result, a speech detection signal having a voltage value +V is supplied to the terminal C from transistor Q8. The speech detection signal renders a field effect transistor FET conductive which acts to ground the AC component of the musical signals generated in the student station 12 whereby the level of the musical signals applied to an amplifier transistor Q9 is reduced to about one half. The magnitude of the speech detection signal derived out from terminal C is set to a value larger than the pinch-off voltage of the field effect transistor FET. A capacitor C1 is connected between the collector electrode of transistor Q5 and the base electrode of transistor Q6 so as to prevent immediate reversal of the Schmitt circuit and the field effect transistor which disturbs the speech.

With the construction described above, when a student who is playing music at a high volume level is called by the teacher, the musical sound of the student is automatically decreased so that the student can accurately catch the call (including speech and instruction) of the teacher, thereby increasing the efficiency of the collective musical instrument training system.

What is claimed is:

1. In a group musical instrument training system comprising a plurality of student stations each including a first electronic musical instrument playing section, a first transmitter and a first receiver coupled to the output of said first electronic musical instrument playing section; and a teacher station including a second electronic musical instrument playing section, a second transmitter, and a second receiver coupled to said second electronic musical instrument playing section, the improvement wherein:

each of said student stations comprises volume control means connected between said first electronic musical instrument playing section and said first receiver for selectively decreasing the output level of said first musical instrument playing section; and said teacher station comprises: detecting means for detecting the presence of the output of said second transmitter for producing a control signal; and means for selecting a student station, said selecting means including gang-operated first, second and third switching means, said first switching means selectively supplying the outputs from said first musical instrument playing section and said first transmitter in the selected student station to said second receiver in said teacher station, said second switching means selectively applying the outputs from said second musical instrument playing section and the second transmitter in said teacher station to said first receiver in the selected student station, and said third switching means selectively applying the output of said detecting means to said volume control means in the selected student station to reduce the volume of the output of said first electronic musical instrument playing section without reducing the volume of the outputs from the teacher station.

2. The collective music training system according to claim 1 wherein said detecting means detects the presence of speech outputs from said second transmitter.

3. The collective music training system according to claim 1 wherein said first, second and third switching means comprises first, second and third gang-operated switches, each switch comprising a plurality of selectively operated contact sets, each contact set corresponding to a given one of the plurality of student stations.

4. A collective music training system comprising a combination of a teacher station and a plurality of student stations, each one of said student stations including a first electronic musical instrument playing section, a first transmitter, a first receiver, and a volume control device for coupling the output from said first electronic musical playing section to said first receiver; and said teacher station including a second electronic musical instrument playing section, a second transmitter, a second receiver, means for coupling the output from said second electrical musical instrument playing section to said second receiver, detecting means responsive to the output from said second transmitter for detecting the presence of a speech signal to be transmitted from the teacher to the student and for thus forming a control signal, first student station selecting means including a plurality of manually operable student station selection switches for applying the outputs of said second electrical musical playing section and said second transmitter to said first receiver of a selected student station, second student station selecting means including a plurality of manually operable student station selecting switches for applying the outputs of said first electronic musical instrument playing section and said first transmitter of a selected student station to said second receiver in said teacher station, and third student station selecting means including a plurality of manually operable student station selecting means for applying said control signal generated by said detecting means to said volume control device to reduce the volume of the output of said first electronic musical instrument playing section without reducing the volume of the outputs from the teacher station.

5. The collective music training system according to claim 4 wherein said first, second and third student station selecting means are ganged with each other for every student station.

* * * * *